United States Patent [19]
Vasudevan

[11] Patent Number: 5,757,846
[45] Date of Patent: May 26, 1998

[54] CDMA COMMUNICATION SYSTEM AND METHOD WITH DUAL-MODE RECEIVER

[76] Inventor: Subramanian Vasudevan, 200 S. McCaslin Blvd. #204, Louisville, Colo. 80027

[21] Appl. No.: 706,078

[22] Filed: Aug. 30, 1996

[51] Int. Cl.$^6$ ............................................. H04B 15/00
[52] U.S. Cl. .................................... 375/200; 375/205
[58] Field of Search ............................. 370/332, 335, 370/209, 342; 375/200, 206, 377, 205; 455/33.1, 63, 65, 296, 54.1; 364/148, 724.011, 724.17, 724.19, 736.03

[56] References Cited

U.S. PATENT DOCUMENTS

| | | |
|---|---|---|
| 5,150,378 | 9/1992 | Mui . |
| 5,239,557 | 8/1993 | Dent ........................................ 375/200 |
| 5,305,349 | 4/1994 | Dent . |
| 5,329,547 | 7/1994 | Ling . |
| 5,361,276 | 11/1994 | Subramanian ...................... 375/200 |
| 5,446,727 | 8/1995 | Bruckert et al. . |
| 5,619,524 | 4/1997 | Ling et al. ........................... 375/200 |

*Primary Examiner*—Stephen Chin
*Assistant Examiner*—Joseph Roundtree
*Attorney, Agent, or Firm*—Brooks & Kushman, P.C.; Peter J. Kinsella

[57] ABSTRACT

A CDMA communication method and system including a receiver that operates in one of two modes, switching between non-coherent and coherent reception on the basis of a channel quality indicator. An important application of this technique would be over the reverse link (from user to base station) of a CDMA system based on the IS-95 cellular standard or the PN-3384 PCS standard.

4 Claims, 2 Drawing Sheets

CDMA COMMUNICATION SYSTEM AND METHOD WITH DUAL-MODE RECEIVER

TECHNICAL FIELD

This invention relates to communication methods and systems using the technique of Code-Division Multiple-Access (CDMA) as the method of channelization and more particularly to a spread-spectrum communication system including a dual-mode receiver that switches between coherent and non-coherent modes of reception on the basis of a channel quality indicator.

BACKGROUND OF THE INVENTION

Code-Division Multiple-Access (CDMA) is a technology that enables multiple users to communicate simultaneously over a shared link using unique signatures or codes. In Direct-Sequence (DS) CDMA systems, transmissions from each user are digitally encoded and then combined with unique, user-specific, code sequences so that the resulting signals occupy a bandwidth that is much larger than the minimum needed for the purposes of such information transfer. In the United States, DS-CDMA based digital systems have been standardized for a number of wireless applications including cellular and Personal Communication Services (PCS). For a description of how the standards for cellular and PCS systems use spread-spectrum signals in order to allow multiple users to share and simultaneously use a common communication channel, see for example, D. P. Whipple, North American Cellular CDMA, Hewlett-Packard Journal, Vol-44:6, pp 90–97, December 1993, and U.S. Pat. No. 5,305,349.

One of the major technical challenges in communicating effectively and reliably over wireless links such as those in cellular or PCS systems is the fact that, unlike wired links, they are characterized by rapid changes in the nature of the path(s) between transmitter and receiver. Two of these phenomena are fading and multipath. Fading refers to rapid changes in signal strength and is accounted for by the movement of the transmitter and/or receiver which changes the path(s) traversed by the signal and the manner in which the resulting signal components combine (constructively or destructively) at the receiver. Multipath consists of the multiple signal echoes that arrive at the receiver after reflection at man-made or natural surfaces in the vicinity of the transmitter and receiver. Such variability impacts the choice of detection and demodulation strategy at the receiving end of any wireless communication system including those employing spread-spectrum technology. U.S. Pat. No. 5,305,349 contains a detailed description of the fading and multipath phenomena that occur in CDMA systems operating in mobile environments as well as the detection techniques they entail.

The issue pertaining to mode of detection may be broadly summarized as follows. Coherent detection, which uses a knowledge of the amplitude and phase changes effected on the transmitted signal by the channel in the detection process, provides better performance than non-coherent detection which does not make use of these channel parameters. The point is illustrated in FIG. 1 where coherent detection is shown to achieve lower bit-error rate (BER) than non-coherent signal demodulation for the same Signal-to-Noise Ratio (SNR). This improvement in performance hinges however on the ability of the receiver to obtain accurate estimates of the channel characteristics and further, requires more processing complexity at the receiver.

In the case of spread-spectrum wireless systems, multipath also enters into the choice of detection technique since the receivers are able to clearly distinguish the signal components that arrive along different paths due to the wider bandwidth of the transmitted signals (1.2288 MHz in the IS-95 Standard). Each of these signal components can be used to determine the transmitted data with greater reliability than would be the case if only one component was used. A well-known method for combining signal components or multipath, for the purposes of improved detection is the RAKE receiver as described in "Digital Communications", by John G. Proakis, McGraw-Hill, 1995. Again, different implementations of the RAKE receiver exist based on the manner in which the multipath is combined and the two broad categories are coherent and non-coherent combining. Coherent combining superposes the complex amplitudes of the received signal components and requires knowledge of the attenuations and phase shifts suffered by each such component due to the channel. Non-Coherent combining superposes the signal components in power and makes no use of channel-related information.

In most spread-spectrum mobile systems, signal demodulation (i.e. the combining operation in the RAKE receiver) is typically non-coherent. This is due to the previously mentioned rapid and random variations in the received signal amplitude and phase resulting from motion of the transmitter relative to the receiver. The unpredictability of these changes increases as the relative speed of the transmitter with respect to the receiver goes up, completely precluding accurate phase estimation and tracking in the highest mobility situations.

It is worth noting however that this approach to receiver design is overly conservative and geared towards the worst case scenario. Consider for example, a wireless system that supports both fixed and mobile users with the latter class showing varying degrees of mobility. Typical coherence times for the channel associated with the fixed users are of the order of 16000 ms. See, "Radio Propagation for Local Loop Applications at 2 GHz", by Werner Mohr, 1994 Third Annual Int. Conf. on Univ. Per. Comm., pp 119–123, 27 Sept–1 Oct 1994, San Diego, USA. This is in contrast to a typical coherence time of 1 ms for the mobile radio channel. See, "Mobile Radio Communications", by Raymond Steele, PENTECH PRESS, 1992. The accuracy with which channel characteristics can be estimated can be related to the coherence time since this parameter indicates the duration of time over which the channel characteristics can be expected not to change significantly. The longer the coherence time of a channel, the slower (and smaller) the variations in the amplitude and phase of a signal that traverses it. It follows that in this situation estimating and tracking the signal phase is also more accurate. Hence coherent demodulation with improved performance over non-coherent detection, is made possible for the users that are fixed.

Between the two extremes of completely unpredictable and exact phase estimates, lie a continuum of scenarios where phase estimates are increasingly more reliable and accurate. At the one end, coherent detection is not possible and non-coherent detection is the only option. In the broader range of channel conditions however, the performance curves of coherent and non-coherent detection cross over as illustrated in FIG. 2. The crossover can be explained as follows. Non-coherent detection outperforms coherent detection when the phase estimates are highly inaccurate. As these estimates become better however, the performance worsening effect of estimation errors decreases and coherent detection yields the performance benefit of using channel-related information.

The previous discussion also makes apparent however, that a receiver based on purely coherent detection is risky in that, while it is usable over a range of channel conditions, it does not provide the facility of accommodating the highest mobility situations which may translate to broken communication links or in the case of a telephony application, dropped calls.

It follows therefore that it makes sense for a CDMA receiver to operate in coherent mode only when reliable channel estimates can be provided and not otherwise. When a switched mode receiver is used, the benefits of coherent detection (obtained when accurate channel estimates are available) are:

a. reduction in transmitter power giving longer battery life;
b. reduction in interference resulting in higher voice-quality;
c. increase in coverage reaching customers at greater distances from cell-sites;
d. increase in capacity thus decreasing the cost per line.

These benefits are all obtained without sacrificing the robustness offered by non-coherent detection under unsteady channel conditions which must occur during any extended interval of operation.

The approach of the present invention for reception of signals in a DS-CDMA system involves switching the receiver between coherent and non-coherent modes of operation so as to obtain the best possible performance for the channel conditions that exist at a given time. A receiver that operates in coherent mode when channel conditions are relatively stable and in non-coherent mode when they are not, can be expected to do better than a receiver that operates in a fixed mode that is either coherent or non-coherent. The coherent-only receiver would do as well under good channel conditions but do poorly (or even be unusable) when the channel is rapidly varying. The non-coherent receiver, while robust, would not take full advantage of the stable channel conditions when they occur. Thus there is a clear advantage to employing a receiver that switches between two modes, operating at any given time in that mode under which lower transmit power is required to meet performance requirements. In building such a receiver, the key issues are the basis on which the mode of operation is determined and the manner in which the dual-mode receiver is implemented.

DISCLOSURE OF THE INVENTION

In accordance with the present invention a receiver for CDMA systems is provided that operates in one of two modes, switching between non-coherent and coherent reception on the basis of a channel quality indicator. An important application of this technique is over the reverse link (from user to base station) of a CDMA system based on the IS-95 cellular standard or the PN-3384 PCS standard.

The method of the present invention results in significant capacity, coverage, or performance improvements in: (i) mobile systems, the users of which exhibit varying degrees of mobility from vehicular speeds down to stationary; (ii) systems with a mix of fixed and mobile users; as well as, (iii) fixed wireless loop systems.

The different embodiments of the dual-mode receiver each look at one or more specific characteristics of the received signal and/or the associated system messages to make a determination of the mode of reception, in particular, the possibility of coherent demodulation of the received signal.

BRIEF DESCRIPTION OF THE DRAWINGS

FIG. 5 is a block diagram of a receiver of the present invention.

DETAILED DESCRIPTION OF PREFERRED EMBODIMENT

The invention is presented in the context of the reverse link of a communication system conforming to the IS-95 standard. An orthogonal modulation technique is specified by the standard for this link since phase information is not required for data demodulation. However such signals can also be demodulated using coherent detection techniques and as pointed out previously, there is a performance advantage to doing so.

Figure 1:
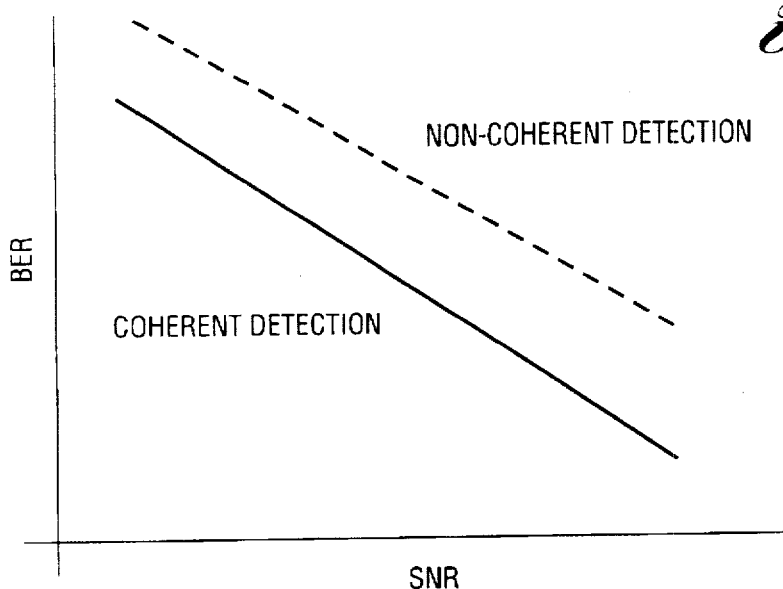
FIG. 1 depicts the better performance, i.e. lower bit-error rate (BER), of coherent signal demodulation versus non-coherent signal demodulation for the same Signal-to-Noise Ratio (SNR)
Figure 2:
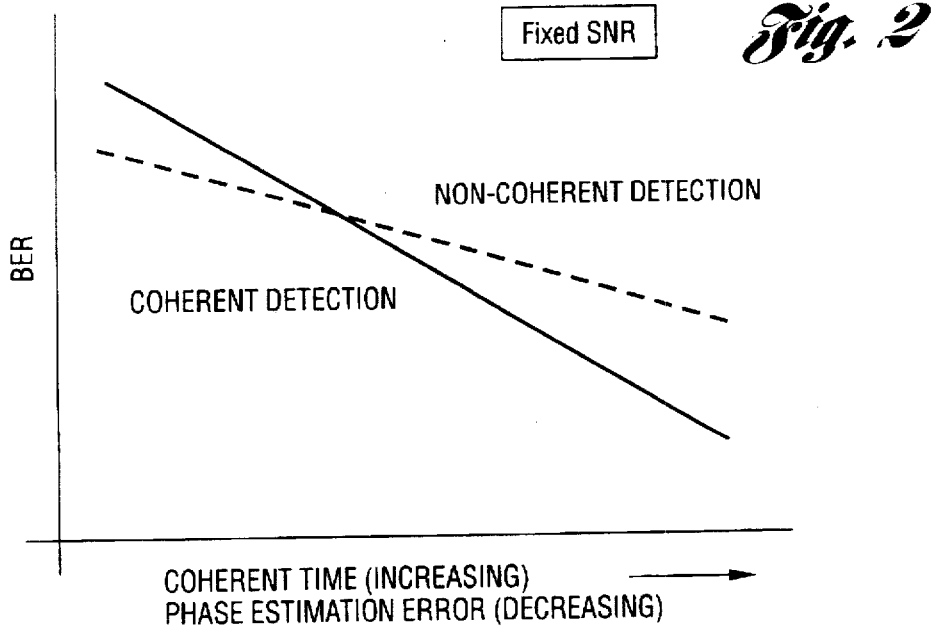
FIG. 2 shows the crossover of the performance curves of coherent and non-coherent detection.
Figure 3:
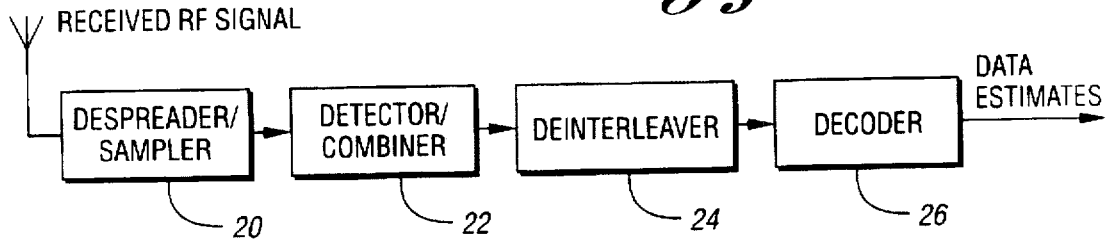
FIG. 3 is a flow chart that shows the method by which the mode of reception is determined.
Figure 3:
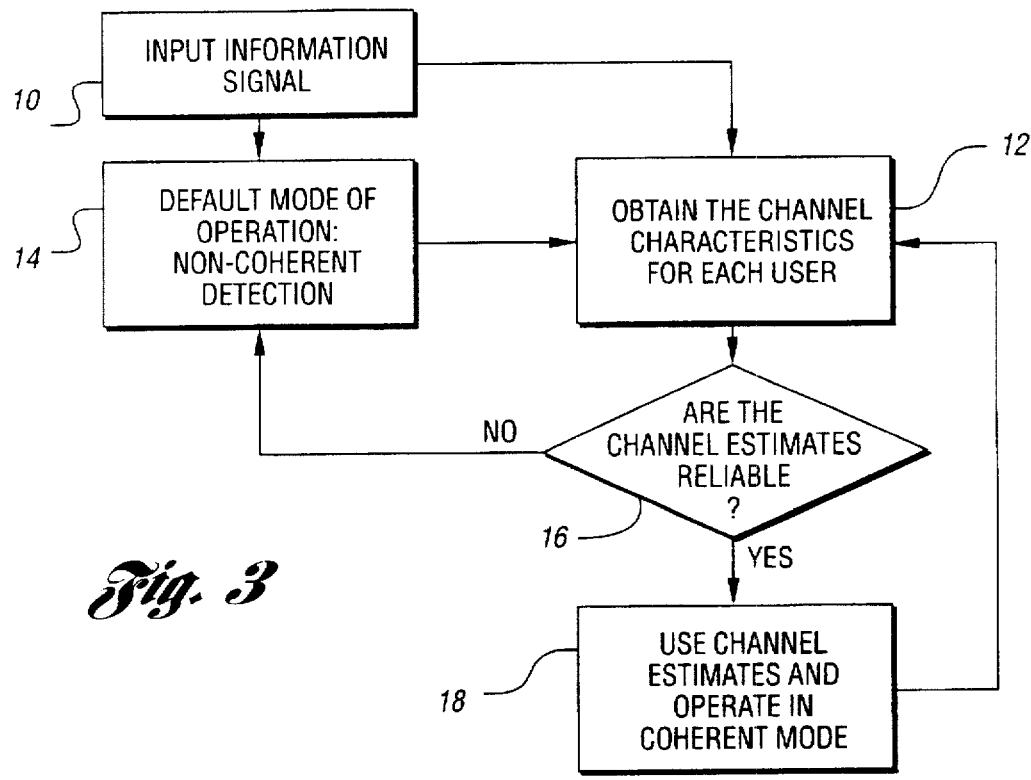

Referring to FIG. 3, a flow chart describes the logic employed in switching between the two modes of operation. As indicated at block 10, the received information signal is fed to both a channel estimator at block 12 (which estimates the channel characteristics) as well as a conventional non-coherent detector indicated at block 14. The non-coherent mode is the default mode of operation. If the estimates of the channel are deemed accurate, as determined by the block 16, the receiver is switched to a coherent mode of operation as indicated by block 18. The receiver switches back to the default mode anytime the channel estimates fail to meet the quality requirements. In order to implement the above method, it is necessary to specify (a) the implementation of the coherent and non-coherent receivers;
(b) the switching operation between the two;
(c) the structure of the channel estimator; and
(d) the mechanism by which a decision to switch modes is made.

Figure 4:
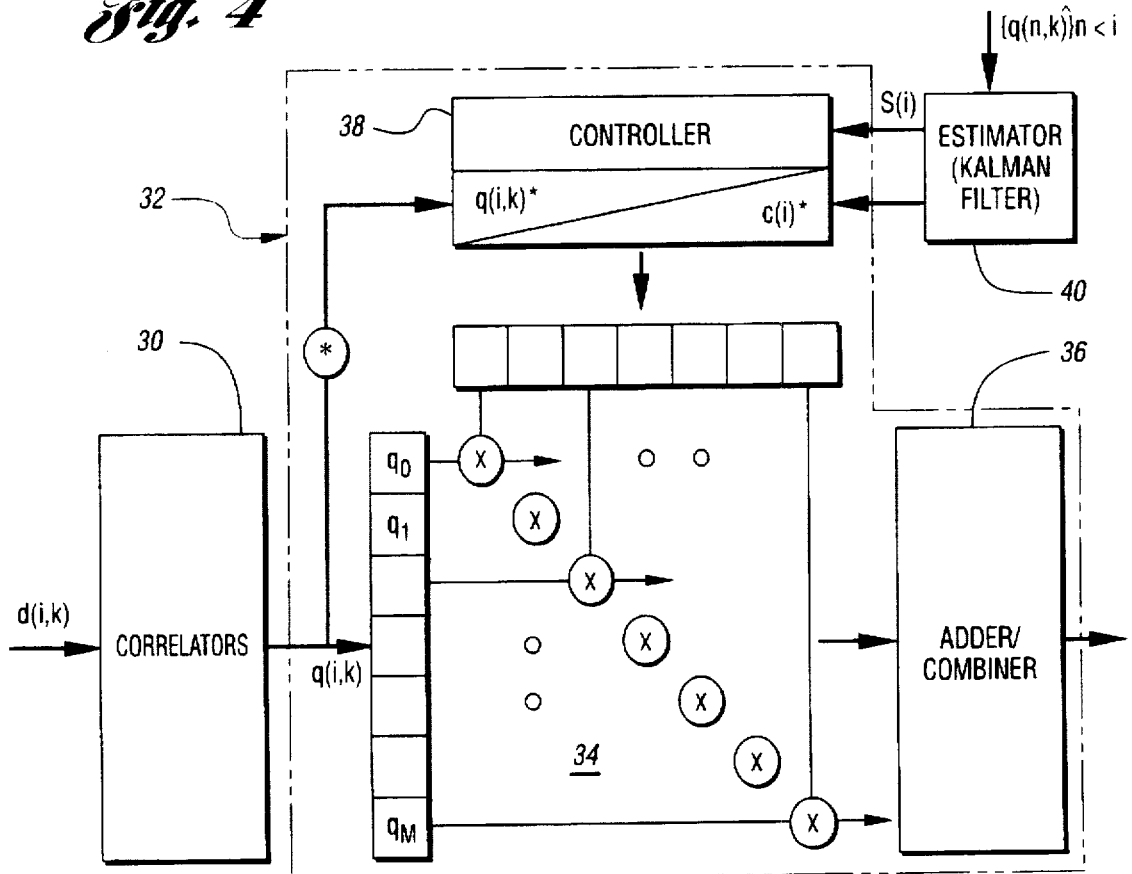
FIG. 4 shows a preferred embodiment of the receiver detector/combiner subsystem that implements the switch between the two modes of operation.

FIG. 4 is a block diagram implementation of the receiver subsystem that implements the functions that are switched as well as the switching mechanism. Before explaining the working of this subsystem, it is helpful to look at the overall operation of a typical receiver as shown in FIG. 5. Reception and detection of the information contained in a spread-spectrum signal typically consists of the following steps which could be undertaken in various ways, and implemented either serially or in parallel:

(i) identifying the time of arrival of the different reflected components (echoes) of the desired signal;
(ii) Despreading these signal components by correlating them with the spreading waveforms to yield a lower rate data bit or codeword stream;
(iii) determining the identity of these bits or code words by correlating each of the time-aligned received signal components with any one of the possible bits or code words and then combining the resulting values to yield a decision variable stream.

This process of correlating and combining is repeated for all possible code words and a decision made in favor of the one that produces the largest decision variable. The steps (i) and (ii) are performed in block 20 of FIG. 5 and the step (iii) is performed in block 22. If interleaving and channel coding have been employed in the system, deinterleaving and Viterbi decoding are incorporated into the receiver and performed at the blocks 24 and 26 respectively. A typical implementation of the block 20, 24 and 26 are disclosed in the U.S. Pat. No. 5,329,547 to Ling. The present invention primarily concerns the operations performed in detector/combiner subsystem 22 and the manner in which the signal components mentioned in (iii), are combined.

Referring again to FIG. 5, the detector/combiner subsystem 22 includes correlators generally designated 30 that correlate the despread, complex-valued data blocks d(i,k) (of 64 or 128 bit length in the case of the IS-95 system) of which there are potentially M (one for each resolvable path between transmitter and receiver), and output an M-length column vector q(i,k) where i is a time index and k is the index of the correlator bank (of which there are as many as there are possible code words).

This complex valued vector q(i,k) representing the correlations between the codeword being tested against (the kth, $w_k$ in this case) and the data (codeword) received along each of the resolvable paths between transmitter and receiver, is input to a switched-combiner subsystem generally designated 32.

In the non-coherent mode, the power in this vector is computed to yield a decision variable. Designating the mth element of q(i,k) as $a_m + jb_m$ where $j=\sqrt{-1}$, this power may be expressed as:

$$P(q(i,k)) = \sum_{m=1}^{M} a_m^2 + b_m^2 \qquad (1)$$

FIG. 4 shows the element-wise multiplication at 34 followed by addition at adder/combiner 36 that implements the required inner product operation which may be expressed as $$\begin{aligned} P(q(i,k)) &= q(i,k)^{*T} q(i,k) \\ &= \sum_{m=1}^{M} (a_m + jb_m)(a_m - jb_m) \end{aligned} \qquad (2)$$

where the superscripts * and $T$ denote the complex conjugation and transposition operations respectively. The right hand side of equation (2) is equivalent to the right hand side of equation (1) and it is obvious that the desired power is obtained by the latter operation.

In the case of the coherent mode, the vector q(i,k)* is replaced by ĉ(i)* where ĉ(i) is the complex valued channel-estimate vector during the ith time interval. Each element of this vector, denoted $f_m + jg_m$, specifies the estimate of the transformation (gain and phase shift) that the signal undergoes travelling along the associated path. The decision variable here is the cross-power and may be written as $$\begin{aligned} C(q(i,k)) &= \hat{c}(i)^{*T} q(i,k) \\ &= \sum_{m=1}^{M} (f_m - jg_m)(a_m + jb_m) \end{aligned} \qquad (3)$$

In the implementation of FIG. 4, it is apparent that the same hardware can be used to implement both coherent and non-coherent combining operations and no duplication of hardware is required to implement both receivers. Note however that the above sets of operations needs to be repeated for each possible codeword $w_k$ since the determination of the transmitted codeword is based on finding the one for which the combiner output is maximized. Switching between the two modes of operation is effected by a controller 38 which downloads the appropriate vector (q(i,k)* or ĉ(i)*) from its buffers to be multiplied by q(i,k). The metric employed by the controller 38 in deciding to switch modes is the estimation error S(i) that is output by channel estimator 40 along with the channel estimate ĉ(i).

The estimator inputs when, say, the channel coefficients for the ith time interval are being estimated, are the complex valued vectors $\{q(n,\hat{k})\}_{n=1}^{i-1}$. For each q(n,k̂), k̂ denotes the particular codeword ($\hat{w}_k$) in favor of which a decision was made during that time interval. q(n,k̂) equals the channel transformation vector c(n) if the codeword $\hat{w}_k$ was indeed the one transmitted during the ith time interval. The estimator outputs both an estimate of the channel parameters (ĉ(i)) as well as an error covariance S(i) that indicates the uncertainty associated with that estimate. The larger the error-covariance, the less reliable the channel estimate. The decision on which mode of demodulation to adopt is determined by this error covariance. If it exceeds a preset threshold, non-coherent demodulation is employed, otherwise, coherent demodulation is employed. A decision to switch modes based on the estimator error covariance is followed by switching the mode of operation of the demodulator. This is preferably accomplished by replacing the second multiplicand in the power-computation block by the channel estimates provided by the estimator. The transition from non-coherent to coherent mode and vice-versa is thus accomplished without any architectural changes, reducing any duplication of hardware. All resources in the receiver continue to be used. Since both modes of operation share a common output, the data input of the estimator that would normally have to be switched to the data output of the receiver being employed, is unchanged.

While an ongoing communication can be carried out in either mode as channel conditions dictate, the following method is proposed for initiating a call where reception is initially non-coherent and then, while the call is in progress, reception may be switched depending on channel quality measurements. While this does mean that in some cases, initial power transmissions are at a higher power than they actually need to be, this approach results in minimizing the probability that call set-up is unsuccessful. The correlator bank outputs {q(i,k̂)} corresponding to the codewords deemed by the non-coherent demodulator to have been sent over the corresponding time intervals, are fed to the estimator to generate an estimate of the channel over the succeeding time intervals. Assuming the estimates are deemed reliable (the estimation errors are below our thresholds), the demodulator is switched to a coherent mode in the manner outlined previously. Switchback to non-coherent mode is effected whenever the channel estimates become unreliable.

Initiating communication in the non-coherent mode thus facilitates estimation of the needed gain and phase parameters in a decision-directed manner. The past values of q(n,k̂) up to the time interval that codeword decisions have been made can be buffered and used to estimate the channel for the interval for which the codeword is currently being detected. The channel gain and phase estimates are updated and the variance in these estimates tracked, which can in turn be used to determine whether or not to switch over to coherent mode.

The channel coefficients can also be estimated somewhat differently without taking recourse to decision-directed methods. The approach of U.S. Pat. No. 5,329,547 to Ling may be followed where the transmission format is modified to incorporate reference bits, and the transformations suffered by these bits used to estimate the channel coefficients.

However, it is preferable not to modify the transmission format since data throughput is reduced by the incorporation of reference bits which do not carry information. Instead, the decision-directed channel estimators which use estimates of the channel based on previously detected codewords are relied on to predict current channel coefficient values. There exist a multiplicity of choices for decision-direction estimation. The channel estimator here is preferably implemented as a Kalman filter. Also, a simpler estimator illustrating the flexibility in receiver design afforded by the dual-mode receiver concept will be detailed hereinafter.

The Kalman filter is a recursive minimum mean-squared error estimator of a stochastic process based on its state-space description. It is preferred for our implementation because of its computational efficiency as well as the fact that the Kalman recursions provide a estimate quality indicator. Kalman filter theory as well as numerous implementations are described in the texts as well as U.S. Pat. No. 5,305,349 and in the interest of brevity with not be further detailed.

If one wishes to drastically pare the complexity associated with channel estimation one may adopt the following approach which basically consists of removing the predictive element associated with channel estimation.

More specifically, the vector $q(n,\hat{k})$ corresponding to the chosen codeword $\hat{w}_k$ is an estimate of the channel transformation $c(l-1)$ for n equal to the l-1st time interval. For the lth time interval, one may simply use $q(l-1,\hat{k})$ (or $q(l-p,\hat{k})$ if that is the most recent codeword known with certainty) as an estimate of $c(l)$.

A simple way to assess the estimate quality is to compute its covariance $S(c(i))$ matrix:

$$S(\hat{c}(i))=E\{\hat{c}(i)-\bar{c}(i)\}^{*T}\}\{\hat{c}(i)-\bar{c}(i)\} \quad (4)$$

where E denotes the expectation operator and $\bar{c}(i)$ the statistical mean of the channel transformation vector at time interval i. In practice this matrix may be approximated by a simple variance calculation over a period of N codeword intervals. Its elements (or some combination thereof) may be compared with preset thresholds and decisions on the mode of operation made on the basis of the outcome of this comparison.

With regard to the performance of estimators such as those discussed previously, it has been noted in Ling that the success of these approaches depends largely on the BER (bit-error rate) being low. It should be noted that the situation in which the decision-directed estimates will be used in the present invention, i.e. operation in coherent mode, are those where the channel is varying very slowly, if at all. In such cases where the user is practically immobile, low BERs can be expected and the assumptions behind using decision-directed estimation will still be valid.

Further, in making a choice on the decision-directed estimation technique, a complexity vs estimate quality issue is encountered. The Kalman filter, while more accurate than the simple receiver above, requires many more computations. A switched-mode receiver allows one to tradeoff complexity against performance without worrying about communication link breakdown by providing a (non-coherent) back-up mode of operation.

Finally, the use of reliability indicators other than those produced in the process of channel estimation, in deciding the mode of operation is considered. These are system parameters that provide an indirect assessment of channel stability which in the context of the IS-95 cellular standard, are the a. Frame Quality Indicator;
b. Transmit Gain Adjust; and
c. Power Control bits.

Each of these parameters is available to the receiver and the controller uses the value (in the case of the Frame Quality Indicator) or the variance (in the case of the Transmit Gain Adjust or Power Control bits), compares it to a preset threshold, and based on the outcome of this comparison, determines the mode of operation. If, for example, the variance of the received power is small, and below the pre-computed threshold, the signal phase may be assumed to be sufficiently stable and the signal coherently demodulated.

In concluding, it should be emphasized that one of the advantages of a switched mode receiver is that a very simple estimator such as the one described can be used with some confidence in the receiver. This estimator would not be used in a single-mode coherent receiver due to the risk of very poor performance under analogous conditions during which the call quality would be significantly degraded or even calls dropped. Since the option to switch to non-coherent mode is provided for in a dual-mode receiver, there is a lower bound on performance and overall performance can get no worse than that attained by a purely non-coherent receiver.

While the forms of the invention herein disclosed are presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A method of detecting a received Code Division Multiple Access signal comprising the steps of:

estimating the channel coefficients of the received signal;

detecting the signal using a coherent mode of operation if the channel coefficient estimates are reliable according to a predetermined reliability indicator; and detecting the signal using a non-coherent mode of operation if the channel coefficient estimates are not reliable according to said predetermined reliability indicator, wherein the reliability indicator is an available system parameter that provides an indirect assessment of channel stability, said system parameter comprising one of the following: a value of a frame quality indicator, a variance of a transmit gain adjust, or a variance of power control bits.

2. The method according to claim 1 wherein the system defaults to a non-coherent mode of operation.

3. A receiver for detecting information contained in a spread-spectrum signal comprising:

an estimator for estimating the channel coefficients of the signal received;

a controller for determining the reliability of the channel coefficient estimates according to a predetermined reliability indicator;

a detector for detecting the signal using a coherent mode of operation if the channel coefficient estimates are reliable according to a predetermined reliability indicator, and for detecting the signal using a non-coherent mode of operation if the channel coefficient estimates are unreliable according to said predetermined reliability indicator, wherein the reliability indicator is an available receiver parameter that provides an indirect assessment of channel stability, said receiver parameter comprising one of the following: a value of a frame quality indicator, a variance of a transmit gain adjust, or a variance of power control bits.

4. The receiver according to claim 3 wherein the receiver defaults to a non-coherent mode of operation.

* * * * *